United States Patent Office 2,878,063
Patented Mar. 17, 1959

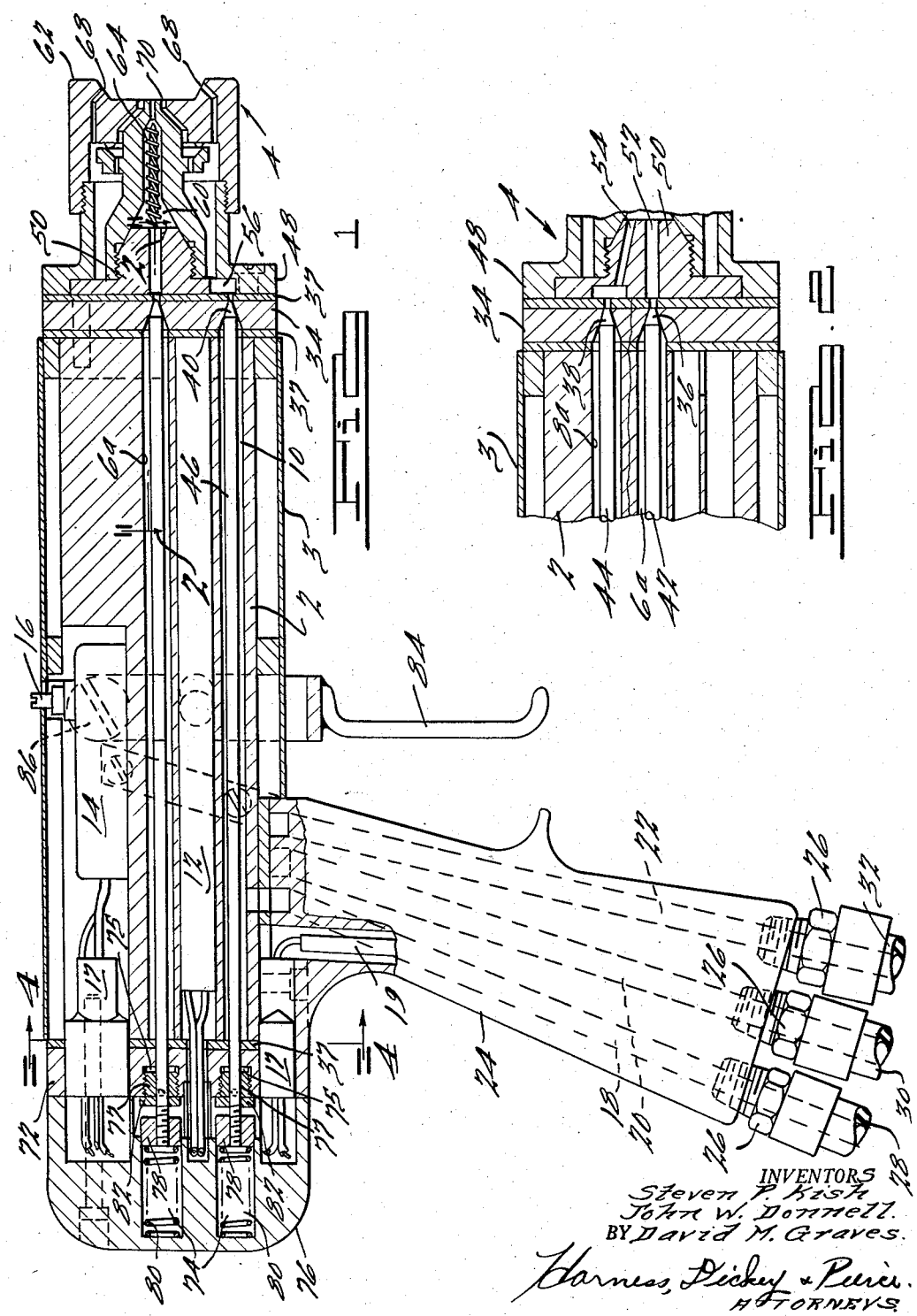

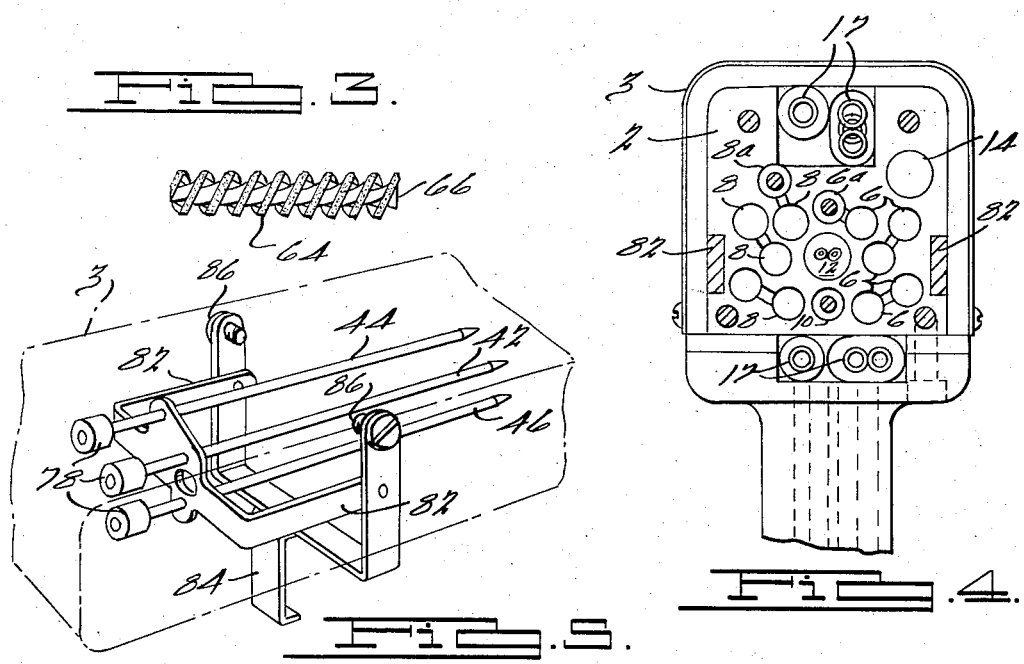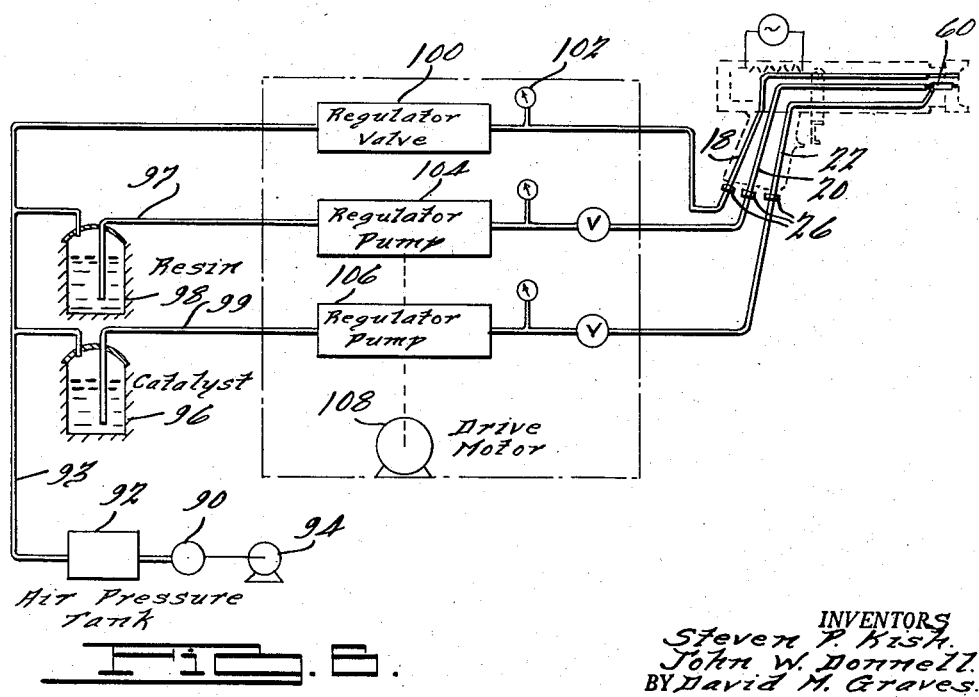

2,878,063

RESIN GUN

Steven P. Kish, Lansing, John W. Donnell, East Lansing, and David M. Graves, Lansing, Mich., assignors to Kish Industries, Inc., Lansing, Mich., a corporation of Michigan Application January 23, 1956, Serial No. 560,740

6 Claims. (Cl. 299—86)

This invention relates to improved methods of spraying resins and to an improved apparatus therefor.

In previous resin spraying processes, liquid resin and catalyst media are often separately discharged from different ports of a spray gun or the like into an air blast which is also discharged from the gun. In these processes the air atomizes the globules of resin and catalyst and carries the atomized particles onto a surface to be coated thereby. It is necessary, in order to produce a proper coating, that the resin and catalyst be thoroughly intermixed, and it is characteristic of these previous processes that mixing must occur in the air blast in transit from the gun to the surface being coated. As a consequence, complete and thorough mixing frequently is not obtained so that uncatalyzed resin tends to build up in localized areas of the surface and over-catalyzed resin tends to build up in other areas of the surface. The result is a non-uniform coating of variable composition which cures at an uneven rate and often tends to sag or run, particularly on vertical or inclined surfaces.

Accordingly, one object of the instant invention is to improve resin spraying methods and apparatus therefor. Another object is to provide improved methods of spraying resin-catalyst mixtures. Another object is to provide improved resin spray guns and resin spray systems for operating the guns. Still another object is to provide improved resin spray apparatus including improved spray guns and resin and catalyst supply means for the guns.

These and other objects are accomplished by the instant invention according to which a polymerizable resin is first thoroughly mixed with a catalyst in an improved spray gun before the mixture is discharged through the spray orifice of the gun. A special mixing chamber is provided within the gun in which the resin and the catalyst are subjected to a high degree of turbulence to insure their thorough intermixing. Additional apparatus is provided to supply resin and catalyst in uniform quantities and at uniform rates to the gun during its operation regardless of normal but ordinarily significant variations in operating pressures such as may be occasioned by changes in composition and viscosity of the resin and catalyst.

The invention will be described in greater detail in connection with the accompanying drawings of which:

Figure 1 is a vertical sectional view showing parts in elevation of a resin spray gun embodying the instant invention;

Fig. 2 is a fragmentary horizontal sectional view taken on the line 2—2 of Fig. 1 and particularly illustrating the resin and catalyst mixing chamber of the gun;

Fig. 3 is an elevational view of the turbulence creating element that forms an operational part of the mixing chamber;

Fig. 4 is a vertical sectional view taken on the line 4—4 of Fig. 1;

Fig. 5 is an elevational view illustrating the operation of the trigger mechanism of the gun; and Fig. 6 is a schematic diagram illustrating operation of the gun and its auxiliary apparatus.

A resin spray gun according to a preferred embodiment of the invention and as shown in the drawings, comprises a body 2 formed of a heat conductive metal such as copper and having a nozzle assembly generally designated 4 mounted at the forward end thereof. The body 2 is enclosed within a sheet metal housing 3 and includes resin and catalyst passages, an air passage, appropriate valves and operating mechanism for the valves, as well as heater elements to heat the resin and the catalyst.

The resin passage 6 is serpentine in form and may include, as shown in detail in Fig. 4, six passes along the length of the gun, the last pass 6a opening at the front of the gun body 2. The catalyst passage 8 also is serpentine and may include six lengths as shown in Fig. 4, its last pass 8a also opening at the front of the gun body 2. The air passage 10 is a single length running from the rear of the body 2 to the forward end thereof.

A main heater 12 and an auxiliary heater 14 are included within the gun body 2 closely adjacent to the resin and the catalyst passages 6 and 8. The main heater 12 is approximately equally spaced between the resin passage 6 and the catalyst passage 8, while the auxiliary heater 14 is placed closely adjacent to the resin passage 6 since the resin may have a relatively high specific heat compared to the catalyst and may, therefore, require additional heat. The heaters 12 and 14 may be electrical resistance elements thermostatically controlled to maintain the resin and catalyst at a desired temperature, preferably at the curing temperature of the resin to be sprayed, by means of a thermostatic switch, as indicated schematically at 16. The input ends of the three passages 6, 8 and 10 are connected to lead-in passages 18, 20 and 22, respectively, which preferably pass through the handle 24 and are connected by couplings 26 to appropriate supply lines 28, 30 and 32.

Electrical connections to the heaters 12 and 14 and the thermostat 16 may be conveniently made, as shown, by plugs 17 which engage mating sockets in the rear end cap 76 of the body to connect the heater circuit to a power cord 19 extending through the handle 24. Thus, the power cord 19 may be grouped with the resin, catalyst and air supply lines at its point of entry into the gun to improve the appearance and handling convenience of the gun.

A valve plate 34 is attached to the forward end of the gun body and is perforated by three tapered holes 36, 38 and 40 that register with the front ends of the resin, catalyst and air passages 6a, 8a and 10, respectively. Valve rods 42, 44 and 46 extend through the passages 6a, 8a and 10, respectively, from the rear of the gun body 2 to the valve plate 34 and engage the tapered apertures 36, 38 and 40, respectively, selectively to close the passages.

The nozzle assembly 4 includes a front retaining plate 48 which is attached to the valve plate 34. A nozzle mounting plate 50 is secured by a shoulder and flange engagement between the valve plate 34 and the front plate 48. The mounting plate 50 is pierced by passageways 52, 54 and 56 that register with the resin, catalyst and air passages 6a, 8a and 10, respectively. A nozzle 58 is threaded upon the mounting plate 50. The nozzle 58 includes an internal mixing chamber 60 generally cylindrical in form and into which the resin and catalyst passages 52 and 54 of the nozzle mounting plate lead. A nozzle cap 62 threaded on the front plate 48 is fitted over the nozzle 58 to direct air flow around the nozzle. Sealing gaskets 37 are provided at both ends of the gun body 2 and also between the valve plate 34 and the nozzle mounting plate 50 to prevent leakage.

The mixing chamber 60 comprises a bore within the nozzle 58, the bore being rearwardly flared to engage the nose of the nozzle mounting plate 50 and terminating in a relatively small aperture at its forward end through which the resin and catalyst mixture is ejected during operation of the gun. A mixing baffle element 64 (Fig. 3) is disposed within the mixing chamber 60. This element 64 is essential to secure adequate and thorough mixing of the resin and catalyst before they are ejected from the gun. It may, for example, consist of a wire brush, preferably of a corrosion resistant material such as brass or copper filaments twisted in spiral form upon a pair of twisted wires 66. In one illustrative embodiment of the invention, a standard .22 caliber rifle cleaning brush is used and the chamber 60 is made of about the same diameter as a .22 caliber rifle bore.

The nozzle cap 62 that fits over the nozzle 58 concentrically therewith and is attached to the front plate 48, includes a central aperture 70 which surrounds and is spaced from the tip of the nozzle 58 when the cap 62 is in place. The nozzle cap 62 also includes a pair of diametrically opposed air passageways 68 through which air is discharged during operation of the gun to flatten and spread the spray discharge into a fan shape. The aperture 70 at the center of the nozzle cap 62 is substantially larger than the tip of the nozzle 58 to provide clearance between the nozzle cap 62 and the nozzle 58 so that air may be discharged not only through the pair of opposed passageways 68 but also in a cylindrical, or conical pattern through the aperture 70 around the tip of the nozzle 58.

The valve rods 42, 44 and 46 that engage the tapered holes 36, 38 and 40 in the valve plate 34 extend through the passages 6a, 8a and 10, respectively. They extend rearwardly through a rear end plate 72 into cavities 74 in an end cap 76. Seals are provided around the valve rods 42, 44 and 46 where they protrude from the rear of the end plate 72 by flexible compression rings 75 held in place by threaded plugs 77. The valve rods 42, 44 and 46 are threaded at their rear ends and fitted with adjustable stop nuts 78. They are biased forwardly to close the tubes by springs 80 which are held in compression between the end cap 76 and the stop nuts 78. The valve rods all pass through a U-shaped yoke 82 that extends from the trigger 84 around the rear end plate 72 (see Fig. 5). When the trigger 84 is squeezed toward the gun handle, it pivots upon its pivot 86 and draws the yoke 82 rearwardly to engage the stop nuts 78 to withdraw the valve rods 42, 44 and 46 from engagement with the valve plate 34. This action opens the valves and allows the resin, catalyst and air to flow from the passages into the nozzle assembly 4.

The stop nuts 78 are adjusted so that when the trigger 84 is operated the valve rods are withdrawn from engagement with the valve plate 34 in an air, resin, catalyst sequence, i. e., as the trigger is squeezed, the air valve rod 46 is retracted first from engagement with the valve plate 34, next, the resin valve rod 42, and lastly the catalyst valve rod 44. The time delay between the opening of the respective valves is relatively small but is enough to permit a start of the flow of each of the ingredients before the next succeeding one opens. Similarly, in closing the catalyst valve closes first, then the resin valve and finally the air valve. This sequence tends to minimize the deposit of catalyzed resin in the nozzle assembly, particularly at the nozzle orifice.

A resin spray gun according to the invention is preferably utilized in a system such as the one shown schematically in Fig. 6. In this system an air pressure tank 92 is supplied by a compressor 90 driven by an electric motor 94. An air conduit 93 is connected from the pressure tank 92 to catalyst and resin storage tanks 96 and 98, respectively. The pressure tank 92 is also connected through a regulating valve 100 to the air input coupling 26 of the resin spray gun. Conveniently, a meter 102 may be installed at the output side of the regulator valve 100 to indicate the operating air pressure and to facilitate adjustment of the regulator valve. The air pressure in the resin and catalyst tanks 96 and 98 forces the resin and catalyst through separate conduits 97 and 99 to a pair of positive displacement metering pumps 104 and 106, respectively. These two pumps may be driven by a single motor 108. They are included in the system to insure delivery of resin and catalyst to the spray gun under positive flow conditions independently of variations in air pressure such as may be occasioned by the on and off action of an air compressor, and independently of variations in the viscosities of the resin and catalyst. Each of the regulator pumps 104 and 106 may include conventional bypass safety overload valves (not shown) to prevent the generation of excessive pressures, particularly when the valves 42 and 44 are closed. Their outputs are connected to the respective resin and catalyst input couplings 26 of the gun. This type of arrangement insures positive delivery of predetermined quantities at uniform, predetermined flow rates of resin and catalyst to the gun regardless of impediments in the supply lines leading from the resin tanks to the gun, and regardless of other variations such as changes in air pressure and changes in resin and catalyst viscosity.

The improved resin spray gun according to the invention may be utilized with any liquid resin capable of being sprayed. For example, resins of the epoxy class and isocyanates give particularly satisfactory results. An important feature of the invention is the method step of mixing the resin and catalyst within the gun before either of them are expelled from the gun into a spray. It has been found that mixing in a chamber according to the instant invention provides a superior degree of uniformity over any other known method of resin spraying. Another feature of the invention relates to the positive displacement metering feed means to deliver resin and catalyst to the gun at uniform, predetermined flow rates. In combination these two features insure delivery by the gun of an improved resin spray that is entirely uniform both as to the degree of mixing of and the proportion between the resin and catalyst.

It is, of course, advisable not to leave the gun unattended for prolonged periods after use because the resin may polymerize and condense in the nozzle. Immediately after use it is best to remove the nozzle 58 and the nozzle cap 62, as may readily be done by unscrewing the nozzle cap from the front plate 48, and to immerse them in a solvent.

What is claimed is:

1. A resin spray gun comprising separate resin and catalyst conduits, a nozzle, means defining a chamber between and communicating with said conduits and said nozzle, and a baffle within said chamber, said baffle comprising a wire brush having radially extending bristles contacting the peripheral wall of said chamber.

2. A resin spray gun according to claim 1 in which said bristles contact the peripheral wall of said chamber along substantially the entire length of said brush.

3. A resin spray gun comprising separate resin and catalyst conduits, a nozzle, means defining a generally cylindrical chamber in flow series between said conduits and said nozzle, and a baffle within said chamber, said baffle comprising a wire brush having radially extending bristles contacting the peripheral wall of said chamber.

4. A resin spray gun comprising separate resin and catalyst conduits, a nozzle, means defining a mixing chamber between and communicating with said conduits and said nozzle, and a baffle disposed within said chamber for thoroughly intermixing fluids passing therethrough, said baffle comprising a spiral wire brush having its main axis aligned in the direction of fluid flow and having radially extending bristles contacting the peripheral wall of said chamber.

5. A resin spray gun comprising a body defining separate resin and catalyst passageways, means for heating materials contained within said passageways, a nozzle member secured to said body and defining a mixing chamber and an outlet orifice communicating with said chamber, means connecting both of said passageways to said mixing chamber at a point opposite from said outlet orifice, and a baffle disposed within said mixing chamber for intimately intermixing fluids passing therethrough, said baffle being a wire brush having radial bristles contacting the peripheral wall of said chamber.

6. A resin spray gun comprising a body defining separate resin and catalyst passageways, means for heating materials contained within said passageways, a nozzle member secured to said body and defining a mixing chamber and an outlet orifice communicating with said chamber, means connecting both of said passageways to said mixing chamber at a point opposite from said outlet orifice, and a baffle disposed within said mixing chamber for intimately intermixing fluids passing therethrough, said baffle being a wire brush having bristles extending transversely to the direction of fluid flow and contacting the peripheral wall of said chamber.

References Cited in the file of this patent
UNITED STATES PATENTS

| | | |
|---|---|---|
| 1,609,465 | Day | Dec. 7, 1926 |
| 1,849,945 | Mobley et al. | Mar. 15, 1932 |
| 2,511,626 | Einbecker | June 13, 1950 |
| 2,513,081 | Clark | June 27, 1950 |
| 2,526,405 | Peeps | Oct. 17, 1950 |
| 2,631,138 | Dannenberg | Mar. 10, 1953 |
| 2,678,846 | Rogers | May 19, 1954 |